Sept. 20, 1966     R. A. MORRIS ETAL     3,274,326

NUDE ION GAGE ASSEMBLY

Filed May 1, 1962

INVENTORS
ROBERT A. MORRIS
ROBERT F. SALAT

BY *Leonard H. King*

ATTORNEY

3,274,326
NUDE ION GAGE ASSEMBLY
Robert A. Morris, Commack, and Robert F. Salat, East Northport, N.Y., assignors to Vactronic Lab. Equipment, Inc., East Northport, N.Y.
Filed May 1, 1962, Ser. No. 191,499
5 Claims. (Cl. 174—18)

The ion gage has proven to be an extremely sensitive and accurate measuring device for use in ultra high vacuum applications, being able to measure pressures below $10^{-8}$ mm. of mercury. Such a device, for example, is set forth in Patent No. 2,605,431, issued to R. T. Bayard. The device therein described shows greatly improved ion collector means and elimination to a great extent of interference by soft X-rays on the ion collector. Besides its extensive use as an accurate pressure measuring device, the ion gage has found uses in the study of surface phenomena and ionic pumping. It has been successfully utilized as a leak detector under high vacuum conditions due to it adherent sensitivity to different gases. However, a major limitation to this type of gage has been the conventional glass envelope constructed about the electrodes, having a relatively narrow access port formed in this envelope, connecting to the vacuum system. Thus, instead of directly measuring the condition inside the vacuum or low pressure chamber, only a sampling of the chamber may be measured, namely, the volume entering the gage through the access port formed in the glass envelope. It has been found that a pressure differential as high as by a factor of 10 exists between the glass envelope and the outside vacuum chamber, with conventional enclosed tubes. Therefore, the "nude ion" gage, formed without any glass envelope and disposed in direct physical contact to the low pressure system, has come to be recognized as the logical successor to the conventional enclosed type. However, such an improved structure presents critical problems in mounting which have hitherto restricted the use of such a device. The nude ion gage consists essentially of a base plate, the electrode assembly formed to one side of the plate, and the base pins extending from the other side of the plate. Such an assembly is required to be positioned in a gage port formed in the wall of the chamber to be evacuated. It will be appreciated that extremely efficient sealing means must be employed to prevent any leakage at this point. It will be noted that in ultra high vacuum applications, a baking technique is generally employed in evacuating the chamber; hence, the sealing assembly must be capable of withstanding extreme levels of heat. For this reason conventional O-rings, of rubber or synthetic resin, have proven inadequate. It will be appreciated that high temperature resistant sealing means must be employed in such applications. Also, it is highly desirable that the gage be adapted for temporary installation, as where a number of tests are being conducted with a single gage unit.

It is therefore a primary object of the present invention to provide an improved nude ion gage assembly adapted to be rapidly installed or dismantled in a low pressure chamber, with highly efficient vacuum sealing means provided in such an installation.

A further object of the present invention is to provide a device that is bakeable when installed in a low pressure chamber while maintaining positive leak-tight sealing means.

Yet a further object of the present invention is to provide an ion gage characterized by the absence of a glass envelope, and which can be positioned within a low pressure chamber to directly sample the pressures existing within this chamber.

These and other objects and advantages of the present invention will be pointed out with particularity or will become apparent from the following description and the drawings appended thereto in which.

Figure 1:
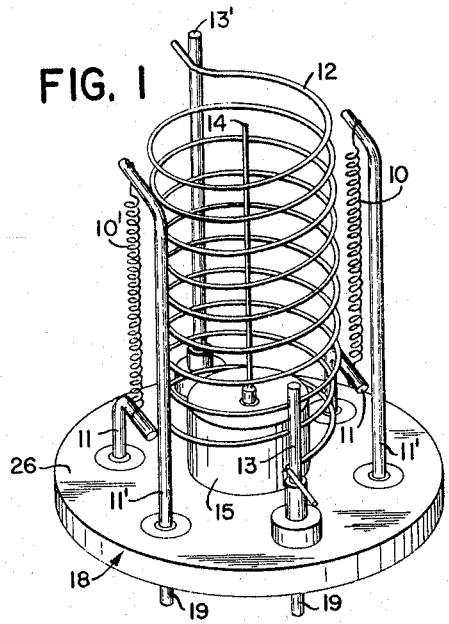
FIG. 1 is a perspective drawing of the nude ion gage employed with the present invention.

Referring now to the drawing, there is shown in FIG. 1 an embodiment of the Bayard ion gage, set forth in further detail in U.S. Patent No. 2,605,431. In operation, electrons are emitted by thermionic cathodes 10 and 10' and are drawn to positively charged grid structure 12. The electrons move at high velocity and impinge upon gas molecules in the region between the electrodes, such collision causing the molecule to break down into a positively charged ion and a free electron. The ion is drawn to negatively charged collector electrode 14.

These electrodes are maintained in spaced relationship by studs 11 and 11' and 13 and 13', which support the cathode and accelerator grid electrodes, respectively, and by support 15 for ion collector 14. Electrical connection is made to the electrodes through the ceramic base plate 18, by connector pins 19 (FIG. 1) which connect to the tube elements in conventional fashion. The preferred embodiment of the present invention employs a dense alumina base 18 with molybdenum lead-throughs soldered in position with a metalized ceramic sealing medium deposited in openings about the lead-throughs. This, in combination with the alumina base, forms a highly heat-resistant structure.

A microammeter (not shown) is connected in series with the ion collector electrode to indicate the current through this electrode due to the ions produced within the tube. Since the current will be proportional to the number of gas molecules, per given unit of volume, a very sensitive measuring of the pressure within the electrode space is possible. Pressures as low as $10^{-8}$ mm. of mercury can be measured using this device.

It will be noted that this ion gage is without the conventional glass envelope which is provided with a port communicating to the vacuum system. Instead, the open gage structure is inserted into the low pressure area, whereby direct sampling of the contents of this chamber takes place. Such a device will give appreciably more accurate results since it reduces the possibility of errors due to ionic pumping in a restricted chamber, and also errors due to a pressure differential, which can easily arise between the glass envelope and the outside vacuum chamber. This differential in some cases runs as high as by a factor of 10. This possibility of error is eliminated using the nude ion gage.

Figure 2:
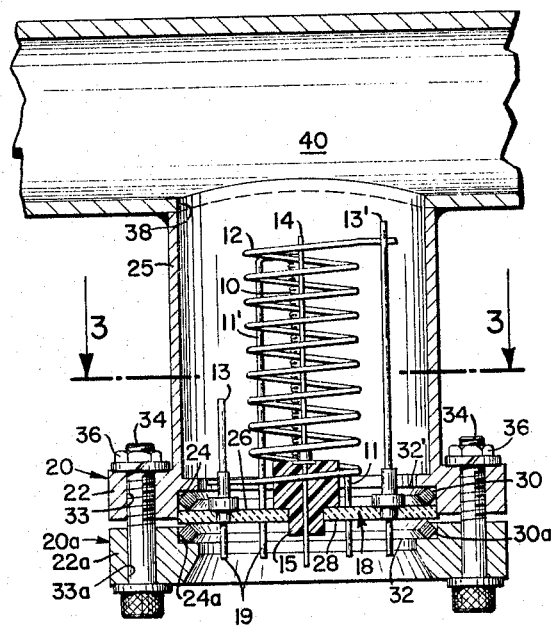
FIG. 2 is a vertical cross-section of the ion gage and an adapter for mounting in a low pressure system.

The adapter unit 20–20a of the present invention comprises two hollow cylindrical members, having an inner diameter somewhat less than that of base plate 18, and an outer diameter substantially larger than the base plate, members 20–20a cooperating to rigidly retain base plate 18, as explained hereinbelow. Members 20–20a each have a flange portion 22–22a, respectively, provided with an annular recess 24–24a, as best shown in FIG. 2. Members 20–20a are formed of hard metal such as stainless steel.

In addition, member 20 is provided with a somewhat elongated hollow wall portion 25 of a height sufficient to enclose the ion gage unit in the assembled condition, as shown in FIG. 2. To assemble the unit, member 20 is positioned about the ion gage and upper surface 26 of ceramic base 18. Similarly, member 20a is disposed about the lower face 28 of base 18, with annular grooves 24–24a in confronting relationship. These grooves provide seats for sealing rings 30–30a, formed of copper of a hardness less than that of the material forming members 20–20a or of the ceramic base 18.

Copper rings 30–30a are diamond shaped in cross-section, as shown in FIG. 2, being provided with upper and lower edges 32. As shown in FIG. 2, ring 30 is interposed between member 20 and upper surface 26 of ceramic base 18, in the area defined by seat 24 formed in member 20. Similarly, ring 30a is interposed between member 20a and the under-surface 28 of ceramic base 18 in the area of seat 24a. Members 20–20a have registering apertures 33–33a formed through the flange portions 22–22a respectively, which are secured by threaded bolts 34 therethrough. When these bolts are tightened by nuts 36, this has the effect of clamping the two members tightly together, bringing strong pressure against the sealing rings 30–30a. Since these rings are of material softer than the abutting substance, namely, hardened metal to one side and dense alumina ceramic material to the other, a minute deformation of the copper material takes place resulting in positive sealing action. It should be particularly noted that such sealing action is in distinction to so-called "knife edge" sealing rings, wherein the metal of the ring is harder than the abutting surface, hence the knife edge is made to penetrate into the adjoining material, forming a permanent seal. Such a device is inapplicable to the present situation since it is envisaged that the apparatus be installed and dismantled as required. Hence, permanent grooves and cuts formed in the assembly would quickly destroy its vacuum sealing capability power as minute variations in positioning formed each time the unit is set up would cause pitting of the surface of the unit, rendering the device unusable. In this device, the relatively inexpensive sealing ring may be replaced should it become deformed. As shown in FIG. 2, hollow wall portion 25 is adapted to be fitted into gage port 38 formed in low pressure chamber 40, such as a pipe line, using conventional sealing means, such as by welding. It will be appreciated that in such installation, the ion assembly communicates directly with the interior of pressure chamber 40, hence it is under the same pressure. Using the novel sealing means of the present invention, the bottom surface 28 of ceramic base 18 is external to the low pressure system, whereby base pins 19 can be connected to the necessary instrumentation of the device, while the upper surface 26 of ceramic base 18 remains in the vacuum-sealed condition due to the action of sealing rings 30–30a, as explained hereinabove.

It will be appreciated that this embodiment of the device of the present invention has the desirable feature of being bakeable, in that if the unit were subject to extremely high heat there would be no rupturing of the vacuum bond, since the heat decomposable components are selected to be able to withstand very high heat levels.

Figure 4:
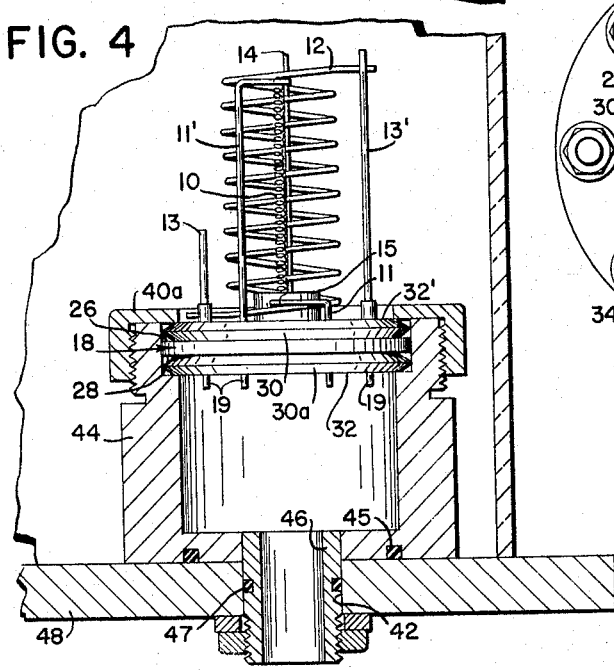
FIG. 4 is a vertical elevation of the ion gage and an adapter for mounting in a bell jar.
Figure 3:
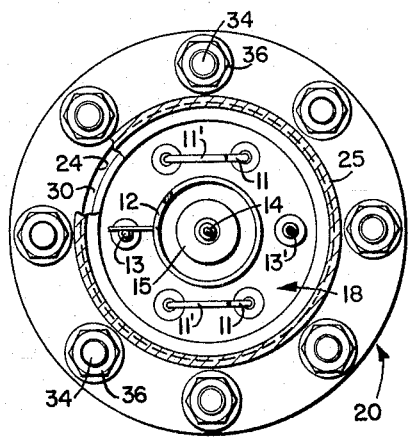
FIG. 3 is a plan view taken along line 3—3 of FIG. 2.

An alternative embodiment of the present invention is shown in FIG. 4 wherein the adapter unit is designed to be placed within port 42 in bell jar 43. In this embodiment, member 40a serves as the upper assembly unit, being disposed proximate to upper surface 26 of ceramic base 18, while a modified form of lower adapter unit 44 is employed having externally threaded means, adapted to be sealed in place in the gage port. However, identical sealing rings 30–30a are employed in this latter embodiment. O-rings 45 and 47 seal members 44 and 46 respectively to base 48. Electrically conductive leads are passed through the bore in member 46 to make connection between terminals 19 and external utilization circuits. Adapter 44 and member 46 may be fabricated as two separate elements or, for convenience of manufacture may be combined as a single component to be machined on a lathe or cast integrally. Should the elements be made separately, as shown in FIG. 4, it is to be understood that they will be suitably joined, as by welding, to form an integral structure as shown prior to assembly. Such manufacturing techniques are well known.

There has been disclosed heretofore the best embodiment of the invention presently contemplated and it is to be understood that various changes and modifications may be made by those skilled in the art without departing from the spirit of the invention.

What is claimed is:
1. A nude ion gage assembly comprising:
a ceramic base having an upper and lower sealing surface that is smooth and substantially flat and provided with a plurality of apertures extending therethrough, said base serving as the mounting plate of an ion gage;
electrically conductive supports extending through said apertures;
means sealing said supports to said ceramic base;
first and second metal retainer members each having two smooth and substantially flat sealing surfaces, said members being of generally hollow configuration;
said retainer members being disposed in confronting relation, said base being interposed between said confronting retainer members whereby said conductive supports are disposed within the bore of at least one of said members;
a first annular member interposed between one of the sealing surfaces of said first retaining member and said upper sealing surface of said ceramic base;
a second annular member interposed between the other of the sealing surfaces thereof said second retainer member and said lower sealing surface of said ceramic base, said electrically conductive supports being disposed inwardly of said annular members;
said first and second annular members having upper and lower axially extending annular knife edges abutting respective confronting sealing surfaces of said retaining members and said ceramic base, said annular members being formed of copper of a hardness less than that of said first and second retaining members and said ceramic base, respectively; and
clamping means urging said first and said second retaining members towards each other to thereby tightly abut said first annular member disposed between said upper surface of said ceramic base and said first retainer, and to also tightly abut said second annular member disposed between said lower surface of said ceramic base and said second retainer, whereby minute deformation of said respective upper and lower edges of said first and second annular members takes place without appreciable deformation of the sealing surface of said base and said retainer members, said annular members thereby serving as seals interposed between the respective areas inwardly of said annular members and the areas outwardly of said annular members.

2. A device as in claim 1 wherein said retainer members each have a first diameter less than that of said ceramic base and a second diameter greater than that of said ceramic base to define a first and a second sealing ring seat, said retainer members in the assembled condition disposed in confronting relation on either side of said base plate, said sealing ring seats facing one of the said sealing surfaces of said ceramic base, respectively, said first annular member disposed in said first ring seat, said second annular member disposed in said second ring seat, and means to secure at least one of said retainer members to a gage port or the like, of a low pressure chamber, in sealing relation.

3. A device as in claim 2 wherein said means to secure at least one of said retainer members to a gage port in sealing relation thereto comprises a sleeve portion formed on said retaining member normally proximate to and concentric about the electrode portion of said ion gage in the assembled condition, said sleeve portion being adapted to be cut to a preselected length and thence adapted to be welded to a gage port at the open end of said sleeve portion.

4. A device as in claim 2 wherein said means to secure at least one of said retainer members to a gage port in sealing relation thereto comprises:

a sleeve portion formed on said retainer member normally proximate to and concentric about the connector pin portion of said nude ion gage in the assembled condition, said sleeve portion comprising a first cylindrical portion having first external threads formed at one end thereof and a second cylindrical portion of substantially smaller diameter, said first and second cylindrical portions being coaxial with and extending from said first external threads, said second cylindrical portion being provided with second external threads, said first and second cylindrical portions defining a radial, transverse interface at the junction therebetween;

said interface being adapted to abut an inner wall of a low pressure chamber such as a bell jar or the like, said second cylindrical portion being adapted to be passed through a gage port formed in a bell jar pressure chamber or the like, whereby said second external threads are disposed on the outside of said chamber;

an O-ring disposed in said interface and adapted to abut against an inner wall of the pressure chamber; and internally threaded fastening means engaging said second external threads disposed on the outside of said chamber to thereby urge said interface into abutment with the inner wall of said chamber whereby said O-ring is compressed to form a seal.

5. Improved mounting means for a nude ion gage assembly having a pair of emitter cathodes, a grid and a collector, said mounting means comprising:

a ceramic base member having upper and lower sealing surfaces, said base member serving as support means for the cathodes, grid and collector of said nude ion gage;

first and second metal retainer members of generally hollow configuration, said first retainer being disposed proximate said base member upper sealing surface, said second retainer being disposed proximate said base member lower sealing surface;

first and second annular sealing members each being formed of copper having a hardness less than that of said ceramic base member and said first and second metal retainer members, each of said sealing members having axially extending upper and lower annular knife edges;

said first annular sealing member being disposed in abutting relationship between said base member upper sealing surface and said first metal retainer;

said second annular sealing member being disposed in abutting relationship between said base member lower sealing surface and said second metal retainer; and clamping means urging said first and second retainer members toward each other whereby said first and second annular sealing members are tightly secured along their respective upper and lower annular edges between said respective base member sealing surfaces and said retainer members and whereby said first and second annular sealing members are minutely deformed in the assembled condition without appreciable deformation of the sealing surfaces of said base member and said retainer members.

References Cited by the Examiner

UNITED STATES PATENTS

| | | | |
|---|---|---|---|
| 1,128,819 | 2/1915 | Schmidt | 174—152 |
| 1,485,275 | 2/1924 | Koerber | 174—152 |
| 2,100,187 | 11/1937 | Handrek. | |
| 2,134,578 | 10/1938 | Remscheid | 174—152 X |
| 2,616,946 | 11/1952 | Scheer. | |
| 2,677,770 | 5/1954 | Smyth et al. | 174—152 X |
| 2,758,232 | 8/1956 | Fox | 313—7 |
| 3,009,012 | 11/1961 | Polese | 174—50.61 X |
| 3,087,113 | 4/1963 | Foster | 313—7 X |

FOREIGN PATENTS

| | | |
|---|---|---|
| 115,468 | 12/1900 | Germany. |
| 166,367 | 6/1921 | Great Britain. |

LARAMIE E. ASKIN, *Primary Examiner.*

ARTHUR GAUSS, JOHN F. BURNS, ROBERT K. SCHAEFER, *Examiners.*

S. CHATMON, *Assistant Examiner.*